United States Patent
Weidl et al.

(10) Patent No.: US 10,030,088 B2
(45) Date of Patent: Jul. 24, 2018

(54) REACTIVE MONOMERS AS COMONOMERS FOR THE PRODUCTION OF POLYMERS

(71) Applicant: BASF SE, Ludwigshafen am Rhein (DE)

(72) Inventors: Christian Hubert Weidl, Speyer (DE); Uwe Held, Velbert (DE); Thomas Mausberg, Haan (DE); Silke Annika Köhler, Mannheim (DE); Bernd Schneider, Dannstadt-Schauernheim (DE); Karolina Hofmann, Ludwigshafen (DE); Linda Winkelmann, Haan (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/324,281

(22) PCT Filed: Jun. 29, 2015

(86) PCT No.: PCT/EP2015/064652
§ 371 (c)(1),
(2) Date: Jan. 6, 2017

(87) PCT Pub. No.: WO2016/005214
PCT Pub. Date: Jan. 14, 2016

(65) Prior Publication Data
US 2017/0204209 A1      Jul. 20, 2017

(30) Foreign Application Priority Data
Jul. 9, 2014   (EP) ..................................... 14176224

(51) Int. Cl.
| | | |
|---|---|---|
| *C08F 216/14* | (2006.01) | |
| *C08F 2/22* | (2006.01) | |
| *C08F 212/08* | (2006.01) | |
| *C08F 218/08* | (2006.01) | |
| *C08F 220/14* | (2006.01) | |
| *C08F 220/18* | (2006.01) | |

(52) U.S. Cl.
CPC ...... *C08F 216/1416* (2013.01); *C08F 212/08* (2013.01); *C08F 218/08* (2013.01); *C08F 220/14* (2013.01); *C08F 220/18* (2013.01); *C08F 2216/1425* (2013.01); *C08F 2216/1433* (2013.01); *C08F 2216/1441* (2013.01); *C08F 2220/1825* (2013.01)

(58) Field of Classification Search
None
See application file for complete search history.

(56) References Cited

U.S. PATENT DOCUMENTS

| | | | |
|---|---|---|---|
| 5,059,632 A | | 10/1991 | Horn et al. |
| 5,576,407 A | * | 11/1996 | Kroner .................. C08F 216/14 526/307.5 |
| 6,391,923 B1 | | 5/2002 | Pollmann et al. |
| 2003/0124261 A1 | | 7/2003 | Falk et al. |
| 2013/0338306 A1 | * | 12/2013 | Kawagoe ................ C08F 16/38 524/557 |

FOREIGN PATENT DOCUMENTS

| | | |
|---|---|---|
| DE | 3838030 A1 | 5/1990 |
| DE | 10163258 A1 | 7/2003 |
| EP | 1 069 139 A2 | 1/2001 |
| EP | 2 457 973 A1 | 5/2012 |
| JP | 2006160829 A | 6/2006 |
| WO | WO-99/61494 A1 | 12/1999 |
| WO | WO-03/062288 A1 | 7/2003 |

OTHER PUBLICATIONS

International Search Report for Patent Application No. PCT/EP2015/064652, dated Aug. 7, 2015.

* cited by examiner

*Primary Examiner* — Vu A Nguyen
(74) *Attorney, Agent, or Firm* — Marshall, Gerstein & Borun LLP

(57) ABSTRACT

The present invention relates to the use of reactive monomers as plasticizers in copolymers. The invention further relates to copolymers obtainable by using the reactive monomers. The present invention moreover relates to processes for the lowering of the glass transition temperature of copolymers with use of the reactive monomers.

17 Claims, No Drawings

REACTIVE MONOMERS AS COMONOMERS FOR THE PRODUCTION OF POLYMERS

CROSS-REFERENCE TO RELATED APPLICATIONS

This is the U.S. national phase of International Patent Application No. PCT/EP2015/064652, filed Jun. 29, 2015, which claims the benefit of European Patent Application No. 14176224.5, filed Jul. 9, 2014.

The present invention relates to the use of reactive monomers as plasticizers in copolymers. The invention further relates to copolymers obtainable by using the reactive monomers. The present invention moreover relates to processes for the lowering of the glass transition temperature of copolymers with use of the reactive monomers.

Other embodiments of the present invention can be found in the claims, the description, and the examples. As will be clear to the person skilled in the art, the features mentioned above and to be set out below for the subject matter of the invention can be used not only in the specific combination indicated in each case but also in other combinations without leaving the scope of the invention. Preference or particular preference is in particular also given to those embodiments of the present invention where a plurality of, or indeed all of, the features of the subject matter of the invention have the preferred and, respectively, particularly preferred definitions.

Reactive monomers such as hydroxybutyl vinyl ether (HBVE), isoprenols, allyl alcohols, and derivatives of these can be used as comonomers for the synthesis of copolymers.

JP2006160829 A2 describes the production of alkenyl polyethers which can serve as starting materials for emulsifiers in emulsion polymerization.

EP2457973 A1 describes the use of water-soluble, hydrophobically associating copolymers as additives in the development, exploitation, and completion of underground mineral oil deposits and natural gas deposits. These copolymers can comprise monomers provided via alkoxylation of ethylenically unsaturated alcohols, an example being hydroxybutyl vinyl ether, optionally followed by etherification.

EP1069139 A2 describes the production of aqueous dispersions via polymerization of olefinically unsaturated, water-insoluble compounds in the presence of water-soluble allyl ether or vinyl ether macromonomers. Use of the macromonomers in emulsion polymerization reactions or suspension polymerization reactions is moreover described.

DE3838030 A1 describes copolymers produced via free-radical copolymerization of at least one olefinically unsaturated polyoxyalkylene alcohol adduct or polyester alcohol adduct and other monomers. These copolymers are used as auxiliaries and/or additives in formulations for the production of polyisocyanate polyaddition products.

WO 03/062288 A1 describes the use of associating polymers which are soluble in an alkaline medium and which comprise, as associating monomers, HBVE alkoxylates or isoprenol alkoxylates.

DE10163258 A1 describes allyl polyalkylene glycol ether carboxylates and vinyl polyalkylene glycol ether carboxylates, and also use of these as copolymerizable emulsifiers and hydrophilic monomers in emulsion polymerization.

WO 99/61494 A1 describes the production of copolymers comprising allylic monomers, for example allyl alcohols or alkoxylated allyl alcohols. Use of these copolymers as reactive plasticizers in thermoplastic polymers is described.

However, WO 99/61494 A1 does not disclose any usage example of these reactive plasticizers in specific thermoplastic polymers.

In the context of the present invention it has been found that the reactive comonomers used in the invention in particular function as a plasticizer in the production of copolymers.

Plasticizers are substances that are widely added to plastics, paints, coatings, rubber, adhesives, and films in order to increase the softness, flexibility, conformability, and elasticity of these in use or during further processing. They can by way of example be low-volatility esters, fatty oils, plasticizing resins, or else camphor.

In what is known as internal plasticization, the plasticizer is introduced in the context of copolymerization. This has the result that the plastic remains durably soft, and the plasticizer does not escape from the material by diffusion. By way of example, vinyl chloride is polymerized with up to 20% of vinyl acetate. Other monomers added for copolymerization of vinyl chloride are maleic acid, ethene, methyl vinyl ether, and methyl acrylate.

Emulsion polymerization of ethylenically unsaturated monomers often uses (meth)acrylic esters as plasticizing monomers, an example being butyl acrylate or 2-ethylhexyl acrylate.

Some of the abovementioned plasticizers of the prior art are molecules with relatively low molecular weight which, after a period of time, migrate out of the polymer (VOC, volatile organic compounds). A first effect of this is that after a period of time the polymers become brittle, and a second effect is liberation of substances (e.g. DEHP) about which there are controversial discussions relating to their toxicological action.

There is therefore a requirement for compounds which, via lowering of glass transition temperature, exert a plasticizing effect during the production and use of copolymers, while exhibiting no significant loss by diffusion from the polymer; ideally, said compounds create no toxicological hazard and are biodegradable.

The underlying technical object is achieved via the in the claims, the description, and the examples, as set out and described in this specification.

The present invention provides the use of compounds of the general formula (I)

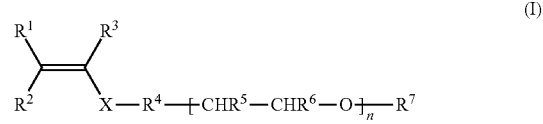

where
$R^1$, $R^2$, $R^3$ are mutually independently, being identical or different, H or —CH$_3$,
X is O or $C_1$-$C_4$-alkoxy,
$R^4$ is a single bond or linear or branched $C_1$-$C_6$-alkylene,
$R^5$, $R^6$ are mutually independently, being identical or different, H, $C_1$-$C_5$-alkyl, or aryl,
$R^7$ are mutually independently, being identical or different, H or $C_1$-$C_6$-alkyl, and
n is an integer from 0 to 200,
as plasticizers in the copolymers.

Unless otherwise stated, all definitions and references to $R^1$, $R^2$, $R^3$, $R^4$, $R^5$, $R^6$, $R^7$, X, and n below relate to the corresponding positions and data in formula (I).

The [—CHR$^5$—CHR$^6$—O—]$_n$ unit of the general formula (I) in the invention can have block structure and/or random composition, preferably being propylene oxide (PO) units. The [—CHR$^5$—CHR$^6$—O—]$_n$ units of the formula (I) can be identical, but are not necessarily identical. By way of example, it is also possible that this is a homogeneous PO or ethylene oxide (EO) chain having n PO and, respectively, EO units, or else this is a heterogeneous ethylene oxide/propylene oxide (EO/PO) chain having n (EO+PO) units, where EO/PO can have block, alternating, or random distribution. In one embodiment the units [—CHR$^5$—CHR$^6$—O—]$_n$ of the formula (I) are identical, an example being PO.

The compounds of the general formula (I) can be used in the invention principally as plasticizers in copolymers produced by free-radical, anionic, and cationic polymerization, preferably free-radical polymerization. It is possible in the invention that the corresponding polymerization reaction takes place in emulsion, in solution, or in bulk, for example in emulsion. In one embodiment of the present invention, therefore, compounds of formula (I) are used as plasticizers in copolymers produced in a free-radical emulsion polymerization reaction.

Another advantage of the inventive use of compounds of the general formula (I) is that they can reduce the viscosity of the polymer dispersion, as described and shown by way of example in this specification. This provides the possibility by way of example of producing dispersions with higher solids content. It is thus possible to save logistics costs (packaging, transport), because the products comprise less water and more active substance. This has been possible only to a limited extent hitherto, because viscosity increases as solids content rises.

The terms "polymerization" and specific polymerization terms such as "emulsion polymerization" are also used when two or more different monomers are used, and for the purposes of the present invention said terms therefore also comprise copolymerization and, respectively, emulsion copolymerization.

The compounds to be used in the invention have plasticizing effect on copolymers produced therewith, in that they lower the glass transition temperature of the copolymers, as described in this specification and revealed in the examples. An advantage of the inventive use here is that the compounds used are not volatile, and have good biodegradability. They moreover exhibit no, or only very little loss from the copolymer by diffusion.

In one embodiment of the present invention R$^1$, R$^2$, and also R$^3$ are H. In another embodiment R$^1$ and R$^2$ are H, and R$^3$ is —CH$_3$.

In one embodiment of the present invention X is O. In another embodiment X is C$_2$-alkoxy.

In one embodiment of the present invention R$^4$ is linear C$_4$-alkylene (butyl). In another embodiment R$^4$ is a single bond.

In one embodiment of the present invention R$^5$ or R$^6$ is H, but R$^5$ and R$^6$ are not both H. In one preferred embodiment R$^5$ or R$^6$ is —CH$_3$. By way of example, either R$^5$ or R$^6$ is H, and the respective other moiety R$^5$ or R$^6$ is —CH$_3$. By way of example, R$^5$ can be H, and R$^6$ can be —CH$_3$.

In one embodiment of the present invention R$^7$ is H.

n can be any number ≥1, for example a number from 4 to 21, from 5 to 20, from 7 to 17, or from 8 to 12. By way of example, n can be 10.

In one particular embodiment of the present invention R$^1$, R$^2$, and also R$^3$ are H, X is O, R$^4$ is linear C$_4$-alkylene (butyl), R$^5$ is H, R$^6$ is —CH$_3$, and R$^7$ is H. In one particular embodiment of the present invention the compound of formula (I) is a hydroxybutyl vinyl ether.

In another particular embodiment of the present invention R$^1$ and R$^2$ are H, R$^3$ is —CH$_3$, X is C$_2$-alkoxy, and R$^4$ is a single bond, thus giving an isoprenol derivative.

The OH number of the compound of formula (I) to be used in the invention can be from 2 mg KOH/g to 225 mg KOH/g, preferably from 10 mg KOH/g to 225 mg KOH/g, preferably from 20 mg KOH/g to 225 mg KOH/g, particularly preferably from 50 mg KOH/g to 120 mg KOH/g. The OH number here can be determined by the methods known to the person skilled in the art, e.g. in accordance with DIN 53240 (solution number) or preferably by means of TAI NMR as is known to the person skilled in the art and described by way of example in this specification.

The polydispersity of the compound according to formula (I) to be used in the invention can be from 1.0 to 2.0, preferably from 1.0 to 1.5, particularly preferably from 1.0 to 1.2, very particularly preferably about 1.1. Polydispersity can be determined here by methods known to the person skilled in the art, preferably by means of GPC, as is known to the person skilled in the art and described by way of example in this specification.

The compound according to formula (I) can by way of example be copolymerized in the invention with one or more olefinically unsaturated compounds (comonomers). It is possible here inter alia to use compounds (comonomers) selected from the group consisting of vinylaromatic compounds, ethylenically unsaturated carboxylic acids having from 3 to 10 carbon atoms, C$_1$-C$_{10}$-alkyl esters of ethylenically unsaturated carboxylic acids having from 3 to 10 carbon atoms, vinyl acetate, ethene, propene, 1,3-butadiene, isoprene, and α-olefins having from 10 to 250 carbon atoms, in each case in pure form or as isomer mixture. Other possible compounds (comonomers) in the invention in this context can also be SO$_4$-containing monomers, for example arylamidopropanesulfonic acid and/or PO$_4$-containing monomers, for example vinylphosphonic acid. For the purposes of the present invention it is possible in each case here to copolymerize one or more of the comonomers with the compound of formula (I). Processes for the copolymerization reaction are known to the person skilled in the art, and comprise inter alia free-radical copolymerization, for example emulsion polymerization.

As set out above and as further revealed herein, it is possible to achieve plasticizing effects via the inventive use and via the process of the invention with use of compounds of formula (I). For the purposes of the present invention, "plasticizer" and "plasticizing effect" imply the ability to lower the glass transition temperature of a copolymer comprising the compound of formula (I). By way of example it is possible in the invention that during the production of copolymers the glass transition temperature of these is lowered by from 5 to 70 K by use of compounds of formula (I). The extent of lowering of the glass transition temperature depends on the glass transition temperature of the other comonomers used and on the quantity used of the comonomer of formula (I). Use of a comonomer with a lower glass transition temperature (of the corresponding homopolymer) lowers the glass transition temperature to a greater extent. Use of a larger quantity of the comonomer with low glass transition temperature also lowers the glass transition temperature of the copolymer to a greater extent.

Methods for measuring glass transition temperature are known to the person skilled in the art and are also described herein. It is preferable in the context of the present invention that the glass transition temperature is measured by means of dynamic scanning calorimetry (DSC), as also revealed by way of example herein.

By analogy with the inventive use described of compounds of formula (I) as plasticizers in copolymers or for lowering glass transition temperature in copolymers, the present invention moreover provides processes for the lowering of the glass transition temperature. All of the definitions and descriptions relating to the inventive use of the compounds of formula (I) therefore likewise apply analogously to the process for lowering the glass transition temperature by means of the compounds of formula (I), and vice versa, as the person skilled in the art can readily discern. This type of process is a copolymerization process, and is known to the person skilled in the art. It can by way of example be carried out as follows. Monomers having a higher glass transition temperature are first copolymerized with a compound of the formula (I) as described herein. In the invention, the resultant copolymer will have a lower glass transition temperature than the homo- or copolymer of the corresponding monomers without compound of formula (I). The glass transition temperature of the copolymers will usually, in the invention, lie between the corresponding values of the individual monomers.

An effective quantity, based on the entire composition of the monomers used, of from 0.1 to 50% by weight, preferably from 0.5 to 30% by weight, preferably from 1 to 20% by weight, particularly preferably from 1 to 10% by weight, of a compound of formula (I) is added in the process of the invention for lowering of the glass transition temperature of copolymers. The glass transition temperature of the copolymer is thus lowered in the invention, preferably by from 5 to 70 K.

The copolymers of the invention can be produced by the process known to the person skilled in the art, for example by way of free-radical copolymerization. The free-radical copolymerization here can take place in aqueous or organic solvents or mixtures of these. Production by way of solvent-free copolymerization is also possible. A specific production process that can be used for the copolymers is free-radical emulsion polymerization. It is possible by way of example to use one or more olefinically unsaturated compounds as comonomers. It is possible here inter alia to use compounds (comonomers) selected from the group consisting of vinylaromatic compounds, ethylenically unsaturated carboxylic acids having from 3 to 10 carbon atoms, $C_1$-$C_{10}$-alkyl esters of ethylenically unsaturated carboxylic acids having from 3 to 10 carbon atoms, ethylenically unsaturated carboxylic acids having from 3 to 10 carbon atoms, vinyl acetate, ethene, propene, 1,3-butadiene, isoprene, and α-olefins having from 10 to 250 carbon atoms, in each case in pure form or as isomer mixture. Other possible compounds (comonomers) in the invention in this context can also be $SO_4$-containing monomers, for example arylamidopropanesulfonic acid and/or $PO_4$-containing monomers, for example vinylphosphonic acid. For the purposes of the present invention it is possible in each case here to copolymerize one or more of the comonomers with the compound of formula (I).

The present invention also comprises production of copolymers with use of compounds of formula (I). By way of example, use is made here of from 0.1 to 50% by weight, preferably from 0.5 to 30% by weight, preferably from 1 to 20% by weight, particularly preferably from 1 to 10% by weight, based on the entire composition of monomers, of the compound as defined in any of claims 1 to 10. In one embodiment here a free-radical polymerization reaction is carried out, for example a free-radical emulsion polymerization reaction. It is possible by way of example to use one or more olefinically unsaturated compounds as comonomers. It is possible here inter alia to use compounds selected from the group consisting of vinylaromatic compounds, ethylenically unsaturated carboxylic acids having from 3 to 10 carbon atoms, $C_1$-$C_{10}$-alkyl esters of ethylenically unsaturated carboxylic acids having from 3 to 10 carbon atoms, vinyl acetate, ethene, propene, 1,3-butadiene, isoprene, and α-olefins having from 10 to 250 carbon atoms, in each case in pure form or as isomer mixture. Other possible compounds (comonomers) in the invention in this context can also be $SO_4$-containing monomers, for example arylamidopropanesulfonic acid and/or $PO_4$-containing monomers, for example vinylphosphonic acid. For the purposes of the present invention it is possible in each case here to copolymerize one or more of the comonomers with the compound of formula (I).

The present invention further comprises copolymers which are, or can be, produced by the process of the invention set out and described here or by the inventive use of the compounds of formula (I). In one embodiment these copolymers comprise from 0.1 to 50% by weight, preferably from 0.5 to 30% by weight, preferably from 1 to 20% by weight, particularly preferably from 1 to 10% by weight, based on the entire composition of monomers, of the compound as defined in any of claims 1 to 10.

The copolymers produced by emulsion polymerization can by way of example be used as binders in paints and coatings or as pressure-sensitive adhesives. Other copolymers of the invention can also be used as components of rubbers and of polymeric materials.

The comonomers to be used in the invention have not only the described plasticizing effect via lowering of glass transition temperature but also an effect on the viscosity of the polymer dispersion. As revealed in the examples, use of the comonomers to be used in the invention in specific formulations also lowers the viscosity of the dispersion. This provides the possibility to the user of increasing the solids content of a dispersion (with no change of viscosity).

The compounds of formula (I) can be produced in a manner known to the person skilled in the art, for example by alkoxylation of unsaturated alcohols (for example, but not exclusively, hydroxybutyl vinyl ether or isoprenol). This type of process is known to the person skilled in the art and is described by way of example in DE 10 2007 057 927 A1.

All data herein relating to standards (e.g. DIN, EN) relate to the versions which were valid and current on 7 Jul. 2014.

The following examples illustrate the present invention, but do not restrict same to the embodiments described therein.

EXAMPLES

Examples of the Invention

1. Synthesis of the Alkoxylates
1.1 HBVE+5 PO 1161.6 g (10 mol) of hydroxybutyl vinyl ether (HBVE) and 20.3 g of potassium methanolate (30% in methanol) were charged to a 10 liter autoclave with propeller stirrer. The autoclave was sealed and evacuated by three repetitions of evacuation (<20 mbar) followed by introduction of nitrogen. The mixture was then heated to 75° C., with stirring (100 rpm) and, to remove the methanol, again subjected to four repetitions of evacuation to <20 mbar (in each case for 20 min) and refilling with nitrogen. The system was now heated to a temperature of 110° C., and adjusted to a supply pressure of 0.5 bar with nitrogen, and propylene oxide (PO) metering was begun, while keeping the overall gauge pressure at or below 5 bar. After about 23 hours all of the PO (2904 g, 50 mol) had been metered into the system, and reaction was allowed to continue for a further 24 hours. The reaction mixture was cooled to 80° C., and evacuated for devolatilization purposes, and nitrogen was used to release the vacuum. The system was then cooled to room temperature, and 0.4 g (100 ppm) of BHT (3,5-di-tert-butyl-4-hydroxytoluene) was added for stabilization.

Total output is 3960 g.
Characterization:
pH (EN 1262, solution C)=11.8
OH number (DIN 53240)=139.7 mg KOH/g
Polydispersity (GPC)=1.07
Water content (EN 13267)=0.08%

1.2 HBVE+10 PO (Single-stage Synthesis)

2700 g (23.244 mol) of hydroxybutyl vinyl ether (HBVE) and 16.9 g of potassium methanolate (32% in methanol)—corresponding to 2000 ppm (based on starting alcohol) were charged to a 20 liter autoclave with propeller stirrer. The autoclave was sealed and evacuated by three repetitions of evacuation (<20 mbar) followed by introduction of nitrogen. The mixture was then heated to 75° C., with stirring (100 rpm) and, to remove the methanol, again subjected to three repetitions of evacuation to <20 mbar (in each case for 10 min) and refilling with nitrogen. The system was now heated to a temperature of from 135 to 140° C., and adjusted to a supply pressure of 0.5 bar with nitrogen, and propylene oxide (PO) metering was begun, while keeping the overall gauge pressure at or below 5 bar. After about 33 hours all of the PO (13 500 g) had been metered into the system, and reaction was allowed to continue for a further 5 hours. The reaction mixture was cooled to 80° C., and evacuated for devolatilization purposes, and nitrogen was used to release the vacuum. 4.6 g of acetic acid (100%) were then used for neutralization, and 0.7 g (100 ppm) of BHT (3,5-di-tert-butyl-4-hydroxytoluene) was added for stabilization.

Total output is 3960 g.
Characterization:
pH (EN 1262, solution C)=6.9
OH number (DIN 53240)=85.9 mg KOH/g
OH number (by TAI NMR)=81.5 mg KOH/g
Polydispersity (GPC)=1.077
Color number (Hazen, EN 1557)=44
Water content (EN 13267)=0.2%

1.3 HBVE+8 PO (Two-stage Synthesis)

75 g (0.65 mol) of hydroxybutyl vinyl ether (HBVE) and 0.47 g of potassium methanolate (32% in methanol)—corresponding to 0.20% by weight (based on starting alcohol) were charged to a one liter autoclave with crossblade stirrer. The autoclave was sealed and inertized by three repetitions of evacuation (<100 mbar) and introduction of nitrogen. The mixture was then heated to 80° C., with stirring (300 rpm), and methanol was removed by distillation for 1 hour. The system was then aerated with nitrogen and heated to a temperature of from 135 to 140° C., and a nitrogen supply pressure of 0.7 bar was established at this temperature. Metering of propylene oxide (PO) was begun, and was conducted in a way that kept the overall gauge pressure at or below 3.1 bar. After about 10 hours the first quantity of PO (182 ml; 4 molar equivalents, based on HBVE) had been metered into the system, and the reaction was allowed to continue for one further hour. The heating was then switched off, and stirring was continued for 12 hours. The mixture was depressurized to atmospheric pressure, and a further 3.2 g of potassium methanolate (32% in methanol)—corresponding to 0.45% by weight (based on mixture) were added. The autoclave was again inertized by three repetitions of evacuation (<100 mbar) and introduction of nitrogen. The mixture was then heated to 80° C., with stirring (300 rpm), and methanol was removed by distillation for 1 hour. After aeration with nitrogen, the system was heated to a temperature of from 135 to 140° C., and a nitrogen supply pressure of 0.7 bar was established at this temperature. Metering of propylene oxide (PO) was restarted, while keeping the overall gauge pressure at or below 3 bar. After about 9 hours the second quantity of PO (275 ml; 3.9 mol) was metered into the system, and the reaction was allowed to continue for a further 4 hours. The system was then cooled to 80° C. and stripped at <100 mbar for 1 hour. The mixture was then aerated with nitrogen and cooled to 60° C., and 1.0 g of acetic acid (90%), and also 0.045 g of BHT were added for stabilization. The reaction mixture was stirred for 30 min and discharged.

Characterization:
pH (DIN 19268; 5% in ethanol/distilled water (1:1), 23° C.)=5.0
OH number (DIN 53240)=94 mg KOH/g 1.4 HBVE+10 PO (Two-Stage Synthesis)

580 kg (4.99 kmol) of hydroxybutyl vinyl ether (HBVE) and 4.4 kg of potassium methanolate (32% in methanol)—corresponding to 0.24% by weight (based on starting alcohol) were charged to a 4.4 m³ reactor with crossblade stirrer. The latter was evacuated to <100 mbar, while being heated to an internal temperature of 80° C. About 3 kg of methanol was then removed by distillation during 30 min, with stirring. Nitrogen was then used to release the vacuum, and evacuation and introduction of nitrogen were repeated until oxygen content reached <0.3%. The system was then heated to a temperature of 135 to 140° C., and a nitrogen supply pressure of 0.3 bar was established at this temperature. Metering of propylene oxide (PO) was begun, and was conducted so as to keep the overall gauge pressure at or below 1.4 bar. After about 14.5 hours the first quantity of PO (830 kg, 14.39 kmol; 3 molar equivalents, based on HBVE) had been metered into the system, and the reaction was allowed to continue for a further 2 hours. The system was then cooled to 75° C. and simultaneously depressurized. A further 57 kg of potassium methanolate (32% in methanol)—corresponding to 1.29% by weight (based on mixture) were then added. The reactor was evacuated to <100 mbar and heated to 140° C. During this procedure, about 39 kg of methanol were removed by distillation in about 1 hour. Nitrogen was used to release the vacuum, and a gauge pressure of 0.05 bar was established. Metering of propylene oxide (PO) was then restarted, while keeping the overall gauge pressure at or below 1.4 bar. After about 13 hours the second quantity of PO (1910 kg, 32.89 kmol; 7 molar equivalents, based on HBVE) had been metered into the system, and the reaction was allowed to continue for a further 2 hours. The system was then cooled to 90° C. and stripped at <100 mbar for 2 hours with a nitrogen flow rate of 15 m³/h. The mixture was then aerated with nitrogen and cooled to 50° C., and 16.8 kg (0.28 kmol) of acetic acid (100%), and also 3.5 kg of BHT, were added for stabilization. The reaction mixture was stirred for 30 min and discharged.

Characterization:
pH (DIN 19268; 5% in ethanol/distilled water (1:1), 23° C.)=6.8
OH number (DIN 53240)=93.6 mg KOH/g
OH number (by TAI NMR)=81.2 mg KOH/g
Color number (Hazen, EN 1557)=3.1

Polydispersity (GPC)=1.098
Water content (EN 13267)=0.73%
Viscosity (23° C., Stabinger, kinematic)=55 mm$^2$/sec 1.5 HBVE+10 BuO 348.9 g (3.0 mol) of hydroxybutyl vinyl ether (HBVE) and 7.5 g of potassium tert-butanolate were charged to a 5 liter autoclave with anchor stirrer. The autoclave was sealed and inertized by three repetitions of introduction of nitrogen (up to a pressure of 5 bar) followed by depressurization. The mixture was then heated to 120° C., with stirring (150 rpm), and 2160 g (30.0 mol) of butylene oxide were metered into the system over a total of 1730 min. Once addition had ended, stirring was continued for a further 4 hours at constant pressure. The reaction mixture is cooled to 80° C. and flushed with nitrogen for 30 min for devolatilization. The product was discharged (yield 2478 g), and 3% by weight of Ambosol were admixed for neutralization/desalination, and the product was filtered through a pressure-filter funnel.

Characterization:
pH (EN 1262, solution B)=6.1
OH number (by TAI NMR)=76 mg KOH/g
Polydispersity (GPC)=1.08

1.6 HBVE+10 PeO 348.9 g (3.0 mol) of hydroxybutyl vinyl ether (HBVE) and 8.8 g of potassium tert-butanolate were charged to a 5 liter autoclave with anchor stirrer. The autoclave was sealed and inertized by three repetitions of introduction of nitrogen (up to a pressure of 5 bar) followed by depressurization. The mixture was then heated to 120° C., with stirring (150 rpm), and 2580 g (30.0 mol) of pentene oxide were metered into the system over a total of 1210 min. Once addition had ended, stirring was continued for a further 10 hours at constant pressure. The reaction mixture was cooled to 80° C. and flushed with nitrogen for 30 min for devolatilization. The product is discharged, and residual pentene oxide is drawn off on a rotary evaporator. 3% by weight of Ambosol were admixed for neutralization/desalination, and the mixture was filtered through a pressure-filter funnel. Yield was 2985 g.

Characterization:
pH (EN 1262, solution B)=6.6
OH number (by TAI NMR)=69 mg KOH/g 1.7 HBVE+11 EO 755.95 g (6.5 mol) and 6.1 g of potassium methanolate (30% in methanol) were charged to a 5 liter autoclave with anchor stirrer. The autoclave was sealed and inertized by three repetitions of evacuation (<20 mbar) and introduction of nitrogen. The mixture was then heated to 75° C., with stirring (100 rpm), and, to remove the methanol, again subjected to four repetitions of evacuation to <20 mbar (in each case for 20 min) and refilling with nitrogen. The system was then heated to a temperature of 150° C., a supply pressure of 0.5 bar of nitrogen was established, and metering of ethylene oxide (EO) was begun, while the overall gauge pressure was kept at 5 bar or below. After about 5 hours all of the EO (3146 g, 71.5 mol) had been metered into the system, and reaction was allowed to continue for one further hour. The reaction mixture was cooled to 80° C. and evacuated for devolatilization, and nitrogen was used to release the vacuum. The system was then cooled to room temperature. 3% by weight of Ambosol were then admixed for neutralization/desalination, and the mixture was filtered through a pressure-filter funnel.

Total output is 3850 g.

Characterization:
pH (EN 1262, solution B)=6.1
OH number (DIN 53240)=97.0 mg KOH/g
Polydispersity (GPC)=1.07

General Analytical Method:
Gel permeation chromatography (GPC): based on DIN 55672-1
Equipment
Separating columns: Polymer Laboratories Ltd., Shropshire, GB
Pump: Merck GmbH, 64239 Darmstadt
UV detector: L4000 (254 nm), Merck GmbH, 64239 Darmstadt
RI detector: ERC 7515 B, ERC GmbH, 93087 Alteglofsheim
Evaluation: Polymer Standard Service (PSS), 55023 Mainz
Injection: S 5200 autosampler, Duratec, 68799 Reilingen
Devolatilizer: S 7505 (vacuum devolatilization), Duratec, 68799 Reilingen
Column sets for various molecular size ranges:
Column set A: quadruple 300×7.5 mm; 5 μm 2×500 Å, 100 Å, 50 Å single analytical precolumn; 5 μm; mixed-gel
Column set B: quadruple 300×7.5 mm; 5 μm, 2×10000 Å, 2×1000 Å single analytical precolumn; 5 μm; mixed-gel
Temperature control: both sets are within temperature-controlled ovens at 30° C.
Pump/Flow rate: L-6200 /1 ml/min
Reagents
Eluent: Chromatography-grade tetrahydrofuran (provided from 2.5 l brown glass bottle with activated charcoal filter)
Sample volume: 20 μl
Sample concentration: 1% in internal standard solution
Internal standard solution: tetrahydrofuran doped with 0.1% of analytical-grade toluene
Calibration: ReadyCal kits (polystyrene, PSS)
1. Mp from 266 to 67 500 g/mol (column set A)
2. Mp from 376 to 2 570 000 g/mol (column set B)
Method The anhydrous sample (content <1%) is dissolved in internal standard solution at 1% strength, filtered if necessary, and injected by way of an autosampler onto the separating columns. Intensity and position of the detected peaks are evaluated.

Calculation
Data recording/evaluation: WINGPC (PSS)
The printout includes inter alia the following data:
Distribution curve
Number average Mn
Weight average Mw
Polydispersity D
Molar mass at peak maximum Mp
Determination of OH Number by TAI NMR:
400 MHz $^1$H NMR in CDCl$_3$ and TAI (trichloroacetylisocyanate) The method is described inter alia in V. W. Goodlett, Analytical Chemistry, vol. 37, No. 3, pages 431 and 432

I. Emulsion Polymerization Process

II.1 Emulsion Polymerization of a Styrene/acrylate Formulation to Determine the Glass Transition Temperature Apparatus: 1.7 liter glass reaction vessel equipped with anchor stirrer and immersed in a water bath for temperature control. Also two storage vessels to provide the feeds (one stirred for the monomer premix and one not stirred for the initiator solution). The feed vessels are suspended on a weighing unit which can determine precisely the quantity metered into the system. Metering is achieved by means of a small gauge pressure in the feed vessel, controlled by way of compressed-air valves. A computer program controls internal reactor temperature, water bath temperature, and feeds.

Comonomer system: Styrene, n-butyl acrylate (alternatively HBVE+10 PO (as in example 1.2)), methacrylic acid (Screening 1, Karolina)

Method:

Production of Comonomer Premix:

Styrene (A g), n-butyl acrylates (B g) (alternatively HBVE+10 PO (as in example 1.2) C g), methacrylic acid (15 g), deionized water (450 g) and anionic emulsifier (Disponil® FES 32 from BASF SE—aqueous solution of a $C_{12}C_{14}$ fatty alcohol ether sulfate with 4 EO—corresponding to 20 g of active substance) are mixed and charged to the stirred feed vessel 1.

For the exact quantities A, B, and C, see table 1.

Production of Initiator Solution:

4 g of sodium metabisulfite ($Na_2SO_5$) are dissolved in 100 g of deionized water. This solution is charged to the second, unstirred, feed vessel 2.

Reaction:

A solution of 4 g of potassium peroxodisulfate ($K_2S_2O_5$) in 250 g of deionized water was charged to the reaction vessel and 225 g of the pre-emulsion were metered into the system from the feed vessel 1. This mixture was heated to 60° C. and, once the temperature had been reached, 8 g of initiator solution were metered into the system from the feed vessel 2. After stirring for 5 minutes at 60° C., parallel metering of the pre-emulsion from feed vessel 1 and of the initiator from feed vessel 2 began. The pre-emulsion was metered into the system over a period of 150 min, and the initiator was metered into the system over a period of 160 min. The internal temperature was kept at 60° C. during the entire metering period. Once the initiator feed had ended, the internal temperature was increased to 65° C. and was kept at this level for 60 min. For additional stabilization of the dispersion, 26 g of a $C_{16}C_{18}$ fatty alcohol ethoxylate (with 18 EO) were added within this post-reaction phase—after about 30 minutes.

The dispersion was now cooled to room temperature and adjusted to pH from 7 to 8 with 25% aqueous ammonia solution.

Work-up and Analysis:

The dispersion was drawn off into packs by way of a 150 micrometer filter.

TABLE 1

| Input weight [g] | | | | Glass transition |
|---|---|---|---|---|
| Styrene (A) | n-Butyl acrylate (B) | HBVE + 10PO (C) | Methacrylic acid | temperature (Tg) [° C.] |
| 800 | 0 | 0 | 15 | 92 |
| 600 | 200 | 0 | 15 | 56 |
| 400 | 400 | 0 | 15 | 20 |
| 200 | 600 | 0 | 15 | −15 |
| 0 | 800 | 0 | 15 | −46 |
| 600 | 0 | 200 | 15 | 51 |
| 400 | 0 | 400 | 15 | 16 |
| 200 | 0 | 600 | 15 | −67 |

II.2 Emulsion Polymerization of a Styrene/acrylate Formulation to Determine Emulsion Properties Apparatus: 1.7 liter glass reaction vessel equipped with anchor stirrer and immersed in a water bath for temperature control. Also two storage vessels to provide the feeds (one stirred for the monomer premix and one not stirred for the initiator solution). The feed vessels are suspended on a weighing unit which can determine precisely the quantity metered into the system. Metering is achieved by means of a small gauge pressure in the feed vessel, controlled by way of compressed-air valves. A computer program controls internal reactor temperature, water bath temperature, and feeds.

Comonomer system: Styrene, n-butyl acrylate (alternatively HBVE+10 PO (as in example 1.2)), methacrylic acid (Screening 1, Linda)

Method:

Production of Comonomer Premix:

Styrene (A g), n-butyl acrylates (B g) (alternatively HBVE+10 PO (as in example 1.2) C g), methacrylic acid (15 g), deionized water (450 g) and anionic emulsifier (Disponil® FES 77 from BASF SE—aqueous solution of a $C_{12}C_{14}$ fatty alcohol ether sulfate with 30 EO—corresponding to 20 g of active substance) are mixed and charged to the stirred feed vessel 1.

For the exact quantities A, B, and C, see table 2.

Production of Initiator Solution:

4 g of sodium metabisulfite ($Na_2SO_5$) are dissolved in 100 g of deionized water. This solution is charged to the second, unstirred, feed vessel 2.

Reaction:

A solution of 4 g of potassium peroxodisulfate ($K_2S_2O_5$) in 250 g of deionized water was charged to the reaction vessel and 225 g of the pre-emulsion were metered into the system from the feed vessel 1. This mixture was heated to 60° C. and, once the temperature had been reached, 8 g of initiator solution were metered into the system from the feed vessel 2.

After stirring for 5 minutes at 60° C., parallel metering of the pre-emulsion from feed vessel 1 and of the initiator from feed vessel 2 began. The pre-emulsion was metered into the system over a period of 150 min, and the initiator was metered into the system over a period of 160 min. The internal temperature was kept at 60° C. during the entire metering period. Once the initiator feed had ended, the internal temperature was increased to 65° C. and was kept at this level for 60 min.

The dispersion was now cooled to room temperature and adjusted to pH from 7 to 8 with 25% aqueous ammonia solution.

Work-up and Analysis:

The dispersion was drawn off into packs by way of a 150 micrometer filter.

Determination of Coagulate: The coagulate collected in the filter was washed with deionized water and dried at 50° C. for 24 hours. It was weighed together with the coagulate scraped from stirrer and thermometer and dabbed dry in a cloth. The quantity of coagulate was stated as % of total theoretical dry content.

Conversion: The dry content of the dispersion was determined by drying of about 5 g at 150° C. for 20 min in an HR 83 Mettler Toledo halogen moisture analyzer. The quotient calculated from the dry content determined and the theoretical dry content was stated as conversion (in %).

Particle Size: Particle size was determined by means of laser diffraction in a LS 13320 Beckman Coulter diffraction particle size analyzer. The $d_{50}$ value determined on the equipment was stated as particle size (in nm).

Viscosity: Dynamic viscosity was determined with a Brookfield DV-II+ viscometer with RV spindle set (spindle 1) and stated in [mPas].

TABLE 2

| Input weight [g] | | | | Conversion [%] | Coagulate [%] | Particle size [nm] | Viscosity [mPas] |
|---|---|---|---|---|---|---|---|
| Styrene (A) | n-Butyl acrylate (B) | HBVE + 10PO (C) | Methacrylic acid | | | | |
| 400 | 400 | 0 | 15 | 97.8 | 0.7 | 175 | 200 |
| 400 | 0 | 400 | 15 | 94.7 | 2.2 | 105 | 75 |
| 400 | 200 | 200 | 15 | 98.1 | 0.4 | 135 | 75 |
| 600 | 0 | 200 | 15 | 97.5 | 0.8 | 135 | 100 |

TABLE 3

| Input weight [g] | | | | Conversion [%] | Coagulate [%] | Particle size [nm] | Viscosity [mPas] |
|---|---|---|---|---|---|---|---|
| Styrene (A) | n-Butyl acrylate (B) | HBVE + 10PO (C) | Methacrylic acid | | | | |
| 400 | 400 | 0 | 15 | 97.8 | 0.7 | 175 | 200 |
| 400 | 0 | 400 | 15 | 94.7 | 2.2 | 105 | 75 |
| 400 | 200 | 200 | 15 | 98.1 | 0.4 | 135 | 75 |
| 600 | 0 | 200 | 15 | 97.5 | 0.8 | 135 | 100 |

II.3 Emulsion Polymerization of a Vinyl Acetate Copolymer Formulation

Apparatus: 1.7 liter glass reaction vessel equipped with anchor stirrer and immersed in a water bath for temperature control. Also two storage vessels to provide the feeds (one stirred for the monomer premix and one not stirred for the initiator solution). The feed vessels are suspended on a weighing unit which can determine precisely the quantity metered into the system. Metering is achieved by means of a small gauge pressure in the feed vessel, controlled by way of compressed-air valves. A computer program controls internal reactor temperature, water bath temperature, and feeds.

Comonomer System: Vinyl acetate, VeoVA 10® from Momentive Specialty Chemicals Inc. (alternatively HBVE+ 10 PO (as in example 1.2)), acrylic acid (Screening 4, Karolina)

Method:
Production of Comonomer Premix:
Vinyl acetate (A g), VeoVA 10® (B g) (alternatively HBVE+10 PO (as in example 1.2) C g), acrylic acid (9 g), deionized water (355 g), disodium tetraborate (4 g), anionic emulsifier (Disponil® FES 32 from BASF SE—aqueous solution of a $C_{12}C_{14}$ fatty alcohol ether sulfate with 4 EO—corresponding to 2 g of active substance), and nonionic emulsifier (Disponil® A 3065 from BASF SE—aqueous solution of a modified $C_{12}C_{14}$ fatty alcohol ethoxylate with 30 EO—corresponding to 20 g of active substance) were mixed and charged to the stirred feed vessel 1.

For the exact quantities A, B, and C, see table 2.
Production of Initiator Solution:
3.2 g were dissolved in 70 g of deionized water. This solution is charged to the second, unstirred, feed vessel 2.

Reaction:
A solution of 0.8 g of potassium peroxodisulfate ($K_2S_2O_8$), 0.4 g of disodium tetraborate ($Na_2B_4O_7$), and anionic emulsifier (Disponil® FES 32 from BASF SE—aqueous solution of a $C_{12}C_{14}$ fatty alcohol ether sulfate with 4 EO—corresponding to 2.6 g of active substance) in a total of 395 g of deionized water were to the reaction vessel. This mixture was heated to 80° C., and once the temperature had been reached parallel metering of the pre-emulsion from feed vessel 1 and of the initiator from feed vessel 2 was begun. The pre-emulsion was metered into the system over a period of 180 min and the initiator was metered into the system over a period of 190 min. Internal temperature was kept at 80° C. during the entire metering time. Once the initiator feed had ended internal temperature was kept at 80° C., with stirring, for a further 60 min. Within this post-reaction phase—after about 30 minutes—27 g of a $C_{16}C_{18}$ fatty alcohol ethoxylate (with 18 EO) were added for additional stabilization of the dispersion.

The dispersion was now cooled to room temperature and adjusted to pH from 7 to 8 with 25% aqueous ammonia solution.

Work-up and Analysis:
The dispersion was drawn off into packs by way of a 150 micrometer filter.

Glass transition temperature was determined by means of dynamic scanning calorimetry (DSC). For this, the dispersion was cast and filmed overnight and then dried at 120° C. in vacuo for one hour. About 9 mg of the material was used for measurement, and this was cooled rapidly from 150° C. before the actual measurement. The heating rate used for the subsequent measurement was 20 K/min.

TABLE 4

| Input weight [g] | | | Glass transition temperature (Tg) [° C.] |
|---|---|---|---|
| Vinyl acetate (A) [g] | VeoVA 10 ® (B) [g] | HBVE + 10PO (C) [g] | |
| 670 | 170 | 0 | 23 |
| 500 | 340 | 0 | 14 |
| 333 | 507 | 0 | 4 |
| 0 | 840 | 0 | −5 |
| 840 | 0 | 0 | 31 |
| 670 | 0 | 170 | 10 |
| 500 | 0 | 340 | −22 |
| 333 | 0 | 507 | −56 |

TABLE 5

| Input weight [g] | | | | Glass transition temperature (Tg) [° C.] |
|---|---|---|---|---|
| Vinyl acetate (A) [g] | VeoVA 10 ® (B) [g] | HBVE + 10PO (C) [g] | Acrylic acid | |
| 670 | 170 | 0 | 9 | 23 |
| 500 | 340 | 0 | 9 | 14 |
| 333 | 507 | 0 | 9 | 4 |
| 0 | 840 | 0 | 9 | −5 |
| 840 | 0 | 0 | 9 | 31 |
| 670 | 0 | 170 | 9 | 10 |
| 500 | 0 | 340 | 9 | −22 |
| 333 | 0 | 507 | 9 | −56 |

II.3 Emulsion Polymerization in an Acrylate-only Formulation

Apparatus: 1.7 liter glass reaction vessel equipped with anchor stirrer. Temperature control was achieved by way of the jacket of the vessel, by means of a thermostat. Also two storage vessels to provide the feeds (one stirred for the monomer premix and one not stirred for the initiator solution). The feed vessels are suspended on a weighing unit which can determine precisely the quantity metered into the system. Metering is achieved by means of a small gauge pressure in the feed vessel, controlled by way of compressed-air valves. A computer program controls internal reactor temperature, water bath temperature, and feeds.

Comonomer system: Methyl methacrylate, 2-ethylhexyl acrylate (alternatively HBVE+10 PO (as in example 1.2)), methacrylic acid Method:

Production of Comonomer Premix:

Methyl methacrylate (A g), 2-ethylhexyl acrylate (B g), HBVE+10 PO (as in example 1.2) C g, methacrylic acid (15 g), deionized water (268.44 g) and anionic emulsifier (Disponil® FES 32 from BASF SE—aqueous solution of a $C_{12}C_{14}$ fatty alcohol ether sulfate with 4 EO —corresponding to 5 g of active substance) are mixed and charged to the stirred feed vessel 1

For the exact quantities A, B, and C, see table 1.

Production of Initiator Solution:

3 g of potassium peroxodisulfate ($K_2S_2O_8$) were dissolved in 60 g of deionized water. This solution was charged to the second, unstirred, feed vessel 2.

Reaction:

A solution of 0.4 g of potassium peroxodisulfate ($K_2S_2O_8$), 0.8 g of sodium hydrogencarbonate ($NaHCO_3$), and 36.42 g of anionic emulsifier (Disponil® FES 32 from BASF SE—aqueous solution of a $C_{12}C_{14}$ fatty alcohol ether sulfate with 4 EO—corresponding to 11 g of active substance) in 405 g of deionized water was charged to the reaction vessel. Parallel metering of the pre-emulsion from feed vessel 1 and of the initiator from feed vessel 2 now began. The pre-emulsion was metered into the system over a period of 80 min and the initiator was metered into the system over a period of 90 min. Internal temperature was kept at 85° C. during the entire metering time. Once the initiator feed had ended internal temperature was kept at 85° C. and stirring was continued for 60 min.

The dispersion was now cooled to room temperature, and a solution of 8.8 g of sodium hydrogencarbonate in 30 g of deionized water was added.

Work-up and Analysis:

The dispersion was drawn off into packs by way of a 150 micrometer filter.

Determination of Coagulate: The coagulate collected in the filter was washed with deionized water and dried at 50° C. for 24 hours. It was weighed together with the coagulate scraped from stirrer and thermometer and dabbed dry in a cloth. The quantity of coagulate was stated as % of total theoretical dry content.

Conversion: The dry content of the dispersion was determined by drying of about 5 g at 150° C. for 20 min in an HR 83 Mettler Toledo halogen moisture analyzer. The quotient calculated from the dry content determined and the theoretical dry content was stated as conversion (in %).

Particle Size: Particle size was determined by means of laser diffraction in a LS 13320 Beckman Coulter diffraction particle size analyzer. The $d_{50}$ value determined on the equipment was stated as particle size (in nm).

Viscosity: Dynamic viscosity was determined at room temperature with a Brookfield DV-II+ viscometer at 20 rpm with RV spindle set (spindle 1) and stated in [mPas].

TABLE 6

| Input weight [g] | | | | | | |
|---|---|---|---|---|---|---|
| Methyl methacrylate (A) | 2-Ethylhexyl acrylate (B) | HBVE + 10PO (C) | Conversion [%] | Coagulate [%] | Particle size [nm] | Viscosity [mPas] |
| 410 | 360 | 0 | 100 | 1.6 | 80 | 4310 |
| 410 | 180 | 180 | 96.5 | 2.6 | 91 | 343 |
| 590 | 0 | 180 | 98.6 | 1.1 | 95 | 216 |

TABLE 7

| Input weight [g] | | | | | | | |
|---|---|---|---|---|---|---|---|
| Methyl methacrylate (A) | 2-Ethylhexyl acrylate (B) | HBVE + 10PO (C) | Methacrylic acid | Conversion [%] | Coagulate [%] | Particle size [nm] | Viscosity [mPas] |
| 410 | 360 | 0 | 15 | 100 | 1.6 | 80 | 4310 |
| 410 | 180 | 180 | 15 | 96.5 | 2.6 | 91 | 343 |
| 590 | 0 | 180 | 15 | 98.6 | 1.1 | 95 | 216 |

Dynamic Scanning Calorimetry (DSC)

The sample/dispersion to be studied was cast and dried at room temperature overnight. The measurement used about 6-9 mg of the dried sample. Before the measurement, the sample was heated to temperatures of from 120° C. to 150° C. and rapidly cooled. The sample was then subjected to measurement at a heating/cooling rate of 20 K/min. The equipment used was a DSC Q2000 from TA Instruments.

What is claimed is:

1. A process for lowering of a glass transition temperature of a copolymer comprising adding, during a polymerization reaction, an effective quantity, based on an entire composition of monomers used, of from 0.1 to 50% by weight, of a compound of general formula (I)

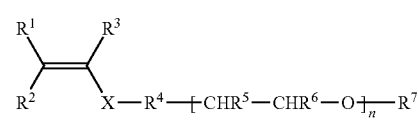

where $R^1$, $R^2$, $R^3$ are mutually independently, being identical or different, H or —$CH_3$, X is O or $C_1$-$C_4$alkoxylene, $R^4$ is $CH_2$—$CH_2$—$CH_2$—$CH_2$—, $R^5$, $R^6$ are mutually independently, being identical or different, H, $C_1$-$C_5$-alkyl, or aryl, $R^7$ is H or $C_1$-$C_6$-alkyl, and n is an integer from 0 to 200.

2. The method according to claim 1, where $R^1$, $R^2$, and $R^3$ are H.

3. The method according to claim 1, where $R^5$ is H and $R^6$ is —$CH_3$.

4. The method according to claim 1, where $R^7$ is H.

5. The method according to claim 1, where X is O.

6. The method according to claim 1, where the copolymers are produced in a free-radical emulsion polymerization reaction.

7. The method according to claim 1, where the OH number of the compound of formula (I) is from 2 mg KOH/g to 225 mg KOH/g.

8. The method according to claim 1, where a polydispersity of the compound of formula (I) is from 1.0 to 2.0.

9. The method according to claim 1, where the compound is copolymerized with one or more olefinically unsaturated compound.

10. The method according to claim 9, where the one or more olefinically unsaturated compound is selected from the group consisting of vinylaromatic compounds, ethylenically unsaturated carboxylic acids having from 3 to 10 carbon atoms, $C_1$-$C_{10}$-alkyl esters of ethylenically unsaturated carboxylic acids having from 3 to 10 carbon atoms, vinyl acetate, ethene, propene, 1,3-butadiene, isoprene, α-olefins having from 10 to 250 carbon atoms,
in each case in pure form or as isomer mixture,
$SO_4$-containing monomers, and $PO_4$-containing monomers.

11. The method according to claim 1, where the glass transition temperature of the copolymer is lowered by from 5 to 70 K.

12. The process according to claim 1 comprising adding from 0.5 to 30%, by weight of the compound of general formula (I).

13. The process according to claim 12 comprising adding from 1 to 20%, by weight of the compound of general formula (I).

14. The process according to claim 13 comprising adding from 1 to 10%, by weight of the compound of general formula (I).

15. The process according to claim 8 wherein the polydispersity of the compound of formula (I) is 1.0 to 1.5.

16. The process according to claim 15 wherein the polydispersity of the compound of formula (I) is 1.0 to 1.2.

17. The process according to claim 7 wherein the OH number of the compound of formula (I) is from 20 KOH/g to 225 mg KOH/g.

* * * * *

UNITED STATES PATENT AND TRADEMARK OFFICE
CERTIFICATE OF CORRECTION

PATENT NO. : 10,030,088 B2
APPLICATION NO. : 15/324281
DATED : July 24, 2018
INVENTOR(S) : Christian Hubert Weidl et al.

Page 1 of 1

It is certified that error appears in the above-identified patent and that said Letters Patent is hereby corrected as shown below:

In the Claims

At Column 16, Lines 30-33, " 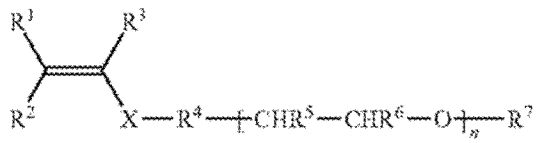 " should be

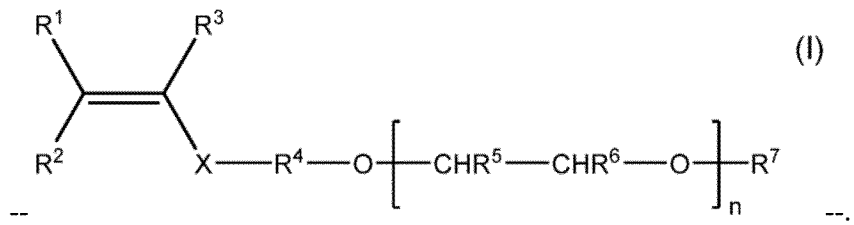 (I)

--    --.

Signed and Sealed this
Twenty-third Day of February, 2021

Drew Hirshfeld
*Performing the Functions and Duties of the
Under Secretary of Commerce for Intellectual Property and
Director of the United States Patent and Trademark Office*